Dec. 13, 1960 L. C. THOMAS 2,964,651

ELECTRICAL CIRCUIT EMPLOYING TRANSISTOR

Filed March 29, 1956

INVENTOR
L. C. THOMAS
BY [signature]
ATTORNEY

United States Patent Office 2,964,651

Patented Dec. 13, 1960

2,964,651

ELECTRICAL CIRCUIT EMPLOYING TRANSISTOR

Lewis C. Thomas, North Plainfield, N.J., assignor to Bell Telephone Laboratories, Incorporated, New York, N.Y., a corporation of New York Filed Mar. 29, 1956, Ser. No. 574,865

2 Claims. (Cl. 307—88.5)

Figure 1:
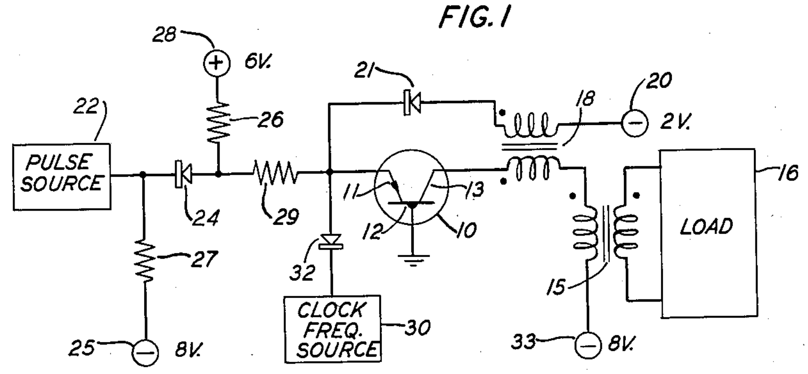

This invention relates to pulse regenerator circuits and, more particularly, to transistor pulse regenerator circuits.

A pulse regenerator circuit is one which only needs to be triggered by a voltage above a predetermined minimum or threshold value to deliver an output pulse independent of the shape, magnitude and duration of the input pulse. When transistor pulse regenerators are utilized in combination with other circuits, particularly in computer circuits, it is necessary that these regenerators possess a certain minimum sensitivity and stability. The achievement of these objectives is particularly difficult when the regenerator is subjected to wide variations in load conditions, ambient temperatures, applied voltages, and control pulses. In solving some but not all of these above problems, prior regenerators have required a relatively large number of parts and consume appreciable power in the quiescent state. Further, these regenerators still exhibit a relatively limited degree of sensitivity and stability when subjected to wide variations in one or more of the above-mentioned variables.

Accordingly, it is a general object of this invention to provide an improved pulse regenerator circuit having relatively few components.

It is another object of this invention to provide a pulse regenerator circuit which is stable and produces the required output pulse for wide variations in output current.

It is another object of this invention to provide a regenerator which is relatively insensitive to changes in ambient temperature or to wide variations in applied potentials.

It is a further object of this invention to provide a stable regenerator adapted to be accurately controlled by control pulses of small magnitude.

It is a further object of this invention to provide a stable regenerator having low power consumption in the quiescent state.

Briefly, in accordance with aspects of this invention, the transistor pulse regenerator includes a feedback path inductively coupled between the collector and emitter, which feedback path is serialy connected between the collector and the primary winding of the output transformer. I have found that by critical determination of the relationship of the characteristics of these two transformers and the effect of these characteristics upon regeneration, regenerators in accordance with my invention achieve an essentialy constant voltage output to a widely variable current load. Further, because of the specific critical relationship of the turns ratio of the feedback transformer in terms of the current gain of the transistor and the ratio of the self-inductance of the output transformer to the self-inductance of the feedback transformer, satisfactory criteria for stable regeneration suitable to be easily controlled are established.

In the absence of circuit parameters determined by the regeneration criteria in accordance with this invention, circuits of this type are subject to several difficulties. One such difficulty is the instability of regeneration at low values of load current; by this is meant that when only a small current is flowing through the output transformer, insufficient feedback is developed through the feedback transformer to insure regeneration capable of producing a pulse duration sufficient to permit turn-off control by the synchronizing clock potential. Thus, for low values of load current, insufficient current is fed back to the emitter to initiate regeneration or, if this circuit is sufficient to initiate regeneration, it is not sufficient to sustain this regeneration for a period of time sufficient to permit cut-off of the regenerator by means of the synchronizing or clock potential. Under these conditions the pulse delivered to the load cannot insure satisfactory operation of subsequent circuits since it is improperly timed and possesses insufficient energy. If the amount of feedback current is increased without regard to the output circuit, sufficient feedback may be established to sustain the regeneration for the required period. However, this increase in regeneration gives rise to insensitivity of the pulse regenerator in response to the clock potential in that the clock potential is unable to bypass sufficient feedback current to turn off the regenerator. Lowering the clock impedance to enable it to by-pass sufficient current would be inconsistent with the desire to maintain low clocking power. For relatively large values of load current, it is a relatively simple matter to establish suitable regeneration by returning a small fraction of the load current through the feedback path. However, when the load current is subject to variations and, particularly when the load current drops to a very low value, untimed and short duration pulses will again occur. Therefore, one possible solution to this problem is to load the output circuit such that a minimum load current is established. This, however, results in a waste in output power when no load current is required to drive subsequent circuits.

In one specific illustrative embodiment of this invention, a stable transistor pulse regenerator circuit comprises a transistor having a large signal current gain $\alpha$ greater than unity, such as a point contact transistor, and having emitter, collector and base electrodes. Connected to the collector electrode is the primary winding of an output transformer, to the secondary winding of which is connected the load circuit which may be a variable load without disturbing the stability of transistor regenerator circuits in accordance with my invention. Connected in series between the primary winding of the output transformer and the collector is the primary winding of a feedback transformer. The secondary winding of this feedback transformer is connected through a quiescently back-biased diode to the emitter of the transistor. Also connected to the emitter of the transistor are a source of timing frequency voltage which may be a sine wave and the external circuitry which applies pulses to be regenerated by this circuit.

In accordance with an aspect of my invention, the secondary to primary winding turns ratio of the feedback transformer, the voltages developed across the primary winding of the feedback and output transformers and the self-inductances of the primary windings of the feedback and output transformers are critically related to each other. The turns ratio of the feedback transformer is less than the current gain of the transistor and the voltage developed across the primary winding of the feedback transformer is at least half the voltage developed across the primary winding of the output transformer. Further, the ratio of the self-inductance of the primary winding of the output transformed to the self-inductance of the primary winding of the feedback transformer has a positive finite value less than unity. Advantageously, in accordance with my invention, the ratio of the turns ratio of the feedback transformer to the large signal current gain of the transistor may be between 0.4 and 0.8 and the ratio of the self-inductance of the primary winding of the output transformer to the self-inductance of the primary winding of the feedback transformer may be in the range of 0.25 to 0.75.

I have found that pulse regenerators in accordance with my invention are insensitive to wide variations in ambient temperature. One of the reasons for this insensitivity is the fact that both of the circuit components connected in the collector circuit are reactive rather than resistive and, hence, the only resistance in the collector circuit is the base-to-collector resistance and the low resistance in the two transformer primary windings. These transformer resistances make the collector bias essentially insensitive to variations in collector leakage currents which vary with temperature. In the conducting state a low transistor base resistance is desirable to deliver maximum pulse voltage to the output. One example of this type transistor is a point contact transistor known as the Western Electric type G.A. 52996. For pulses in the megacycle range, each transformer primary winding may have a direct current resistance less than one-half an ohm. Circuits in accordance with this invention have been operated successfully in the temperature range of −20 to +80 degrees C.

Accordingly, it is a feature of this invention to utilize in a transistor pulse regenerator circuit series inductive feedback in combination with an inductive output circuit having characteristics such that the rate of the voltage developed across the primary winding of the feedback transformer is at least half as large as the voltage developed across the primary winding of the output transformer. This feedback transformer in combination with the output transformer exhibits characteristics such that the self-inductance of the output transformer is less than the self-inductance of the feedback transformer, reference being made in each instance to the primary winding.

It is another feature of this invention to employ an inductive feedback path connected in series with the output transformer of a transistor pulse regenerator in which the secondary winding to primary winding turns ratio of the feedback transformer is less than the large signal current gain of the transistor, which current gain is greater than unity, and wherein the transformers have characteristics such that the voltage developed across the primary winding of the feedback transformer is at least half as large as the voltage developed across the primary winding of the output transformer.

It is still a further feature of this invention to employ a point contact transistor in a pulse regenerator in combination with an output transformer and a feedback transformer serially connected between the transistor and the output transformer, the two transformers having such characteristics that the ratio of the self-inductance of the primary winding of the output transformer to the self-inductance of the primary winding of the feedback transformer is less than unity. These transformer characteristics, in combination with a turns ratio of the feedback transformer no larger than the current gain of the transistor, determine satisfactory regeneration for wide variations in output current.

Figure 2:
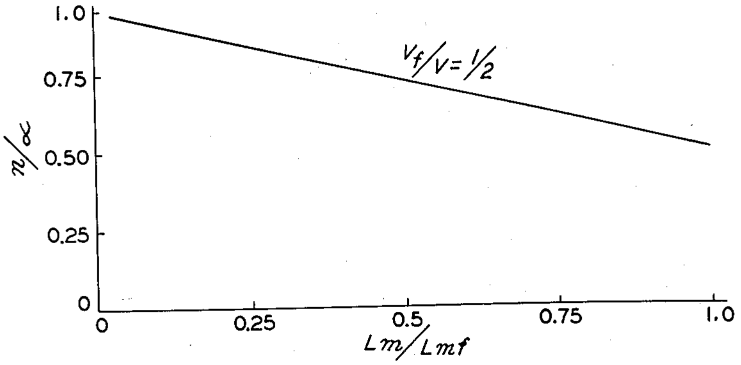

A complete understanding of this invention and of these and various other features thereof may be gained from consideration of the following detailed description and the accompanying drawing in which:

Fig. 1 is a schematic representation of one specific illustrative embodiment of this invention; and Fig. 2 is a normalized graph depicting the approximate expression for the regeneration criteria in accordance with this invention.

Referring now to Fig. 1 there is depicted, in accordance with one specific illustrative embodiment of this invention, a point contact transistor 10 including emitter 11, base 12 and collector 13. An output transformer 15 has its primary winding connected to collector 13 and its secondary winding connected to output load 16.

A feedback transformer 18 has its primary winding connected in series between the transistor collector 13 and the primary winding of output transformer 15. The secondary winding of transformer 18 is connected between a source 20 of potential and emitter 11 by means of series diode 21. Pulses to be regenerated are applied to the emitter 11 of the transistor 10 through a diode 24 and resistor 29 from external circuitry which can be considered to define a pulse source 22. This pulse source 22 is connected to a diode AND circuit including the diode 24 and resistors 26, 27 to each of which is connected a source 25 and 28 of potential, while resistor 29 is a decoupling resistor connected between this AND circuit and emitter 11. A source 30 of clock or synchronizing voltages is connected to transistor emitter 11 through diode 32. A source 33 of negative potential is connected to the primary winding of the output transformer remote from collector 13. Synchronization is achieved by by-passing a portion of the feedback current into any suitable pulse means which exhibits a high impedance output and supplies control pulses to the transistor in a manner well known in the art. Other means for by-passing a portion of the feedback current may be substituted for source 30 and diode 32. If no synchronous control is required, source 30 and diode 32 may be omitted. Also, output load 16 might be any load and advantageously might be a load requiring wide variations in output currents such as a large number of logic circuits adapted to be selectively gated. For example, in one specific embodiment of this invention, a pulse regenerator employed to drive over fifteen diode logic circuits is gated in such manner that the load current varies from that required to drive one logic circuit to that required to drive over fifteen logic circuits.

Under operating conditions, when no signals are applied from sources 22 and 30, a small current flows from source 28 through resistor 26, diode 24 and resistor 27. The effect of this current flow is to maintain a cut-off bias on the transistor emitter 11 such that the transistor is normally quiescent or nonconducting. If the voltage of the clock or synchronizing source is limited to a two-volt peak or similar low value to cancel the back-bias normally applied to diode 32 by the AND circuit, no current will flow through either resistor 29, feedback diode 21 or clock diode 32, thus standby or quiescent power will be limited to the losses due to collector leakage current and the previously mentioned AND gate current. A greatly improved control is achieved, however, by increasing the clock potential slightly. This allows a small amount of current to flow through diodes 32 and 21 but results in a very slight increase in quiescent power dissipation.

When a positive input pulse is applied to the network from source 22, the current which has been flowing through diode 24 and resistor 27 is replaced by additional current flow through resistor 27 which effectively turns diode 24 off. The current which was formerly flowing through diode 24 now flows through resistor 29 to emitter 11. The clock voltage at this time is slightly negative and bypasses emitter current through diode 32 until the clock voltage rises above the conduction point of the transistor. Diode 32 is now effectively back-biased by the clock voltage and all of the current through resistors 26 and 29 flows through emitter 11 to base 12. Thus, the clock potential is capable of delaying or otherwise controlling the triggering of the transistor. In order for proper triggering to take place under the control of the clock potential, diode 24 must remain nonconducting as the emitter voltage rises. When triggering takes place, the collector current increases rapidly and provides sufficient feedback current through transformer 18 to initiate regeneration. The electromotive force developed across the secondary winding of feedback transformer 18 causes diode 21 to become conducting and allows this feedback current to flow through the emitter. Regeneration thus takes place and the transistor is driven towards saturation while adequate current is delivered through the output transformer to the load. The negative swing of the clock voltage off the regenerator by rendering diode 32 conducting and effectively robbing the emitter of feedback current. When the clock potential again rises, the emitter voltage follows this rise up to the amount of the negaive bias applied from the network, including resistors 26 and 27, diode 24 and source 28 of potential. If an input pulse is again present, the emitter potential follows the rise of the clock potential up to the conduction point of the transistor characteristic where triggering occurs and the regeneration cycle is repeated.

An understanding of the specific critical relationships between the various circuit parameters of the specific embodiment of this invention depicted in Fig. 1 and of the attainment of a stable regenerator thereby can be gained from consideration of the following mathematical analysis together with the graph of Fig. 2. I have found that satisfactory sensitivity and stability are attained when the circuit parameters satisfy certain regeneration criteria. These criteria relate principally to the feedback and output transformers and the current gain of the transisitor when the circuit is connected in accordance with Fig. 1 of the drawing. In order for regeneration to become established after triggering, the current fed back to the emitter must be more than the original increment of emitter current which produced the feedback current.

Stating this mathematically:

$$I_{fb} \geqq I_e + I_R \qquad (1)$$

where $I_{fb}$=current fed back to the emitter,
$I_e$=emitter current which produced feedback current, and
$I_R$=that portion of feedback current flowing through resistor 29.

If the feedback current is referred to the collector mesh, one obtains the equation:

$$I_{fb} = \frac{I_c}{n} - \frac{I_{Mf}}{n} \qquad (2)$$

where $I_c$=the collector current exclusive of $I_{co}$, the leakage current in the collector circuit,
$I_{Mf}$=the magnetizing current in the primary winding of the feedback transformer, and
$n$=the turns ratio of the feedback transformer.

One expression for the collector current is:

$$I_c = I_L + I_M \qquad (3)$$

where $I_L$=the current delivered to the load, and
$I_M$=the magnetizing current of the primary winding of the output transformer.

The general equation for emitter current is:

$$I_e = \frac{I_c}{\alpha} \qquad (4)$$

where $\alpha$=the large signal current gain of the transistor, and
$I_e$=the emitter current, which is the general equation of large signal current gain in a transistor. Substituting Equation 3 is Equation 2 and substituting Equation 4 in Equation 1 we now equate Equation 2 to Equation 1 and obtain:

$$\frac{I_L + I_M - I_{Mf}}{n} \geq \frac{I_c}{\alpha} + I_R \qquad (5)$$

Subtracting $I_R$ from both sides of the equation and multiplying both sides of the equation by the term $$\frac{n}{I_L + I_M}$$

and substituting for $I_c$ the equality expressed in Equation 3, we obtain the general expression of the criteria for regeneration in the regerenerator depicted in Fig. 1, which is:

$$\frac{n}{\alpha} \leq \left(1 - \frac{I_{Mf}}{I_M + I_L}\right) - \frac{I_R}{I_M + I_L} n \qquad (6)$$

In order to simplify Equation 6, it is assumed that the voltage pulses which exist across the feedback and output transformer during regeneration are flat-topped. Thus, the expression for magnetizing currents of the transformers, which is:

$$I_M = \int_0^t \frac{V}{L_M} dt \qquad (7)$$

becomes $$I_M = \frac{Vt}{L_M} \qquad (8)$$

and $$I_{Mf} = \int_0^t \frac{V_f}{L_{Mf}} dt \qquad (9)$$

becomes $$I_{Mf} = \frac{V_f t}{L_{Mf}} \qquad (10)$$

where $L_M$=the magnetizing inductance of the output transformer,
$L_{Mf}$=the magnetizing inductance of the feedback transformer, and
$t$=the period of regeneration,
$V_f$=voltage developed across the primary winding of the feedback transformer,
$V$=voltage developed across the primary winding of the output transformer.

Substituting these expressions for magnetizing currents in Equation 6 and assuming that the load currents are so small, with respect to the magnetizing current of the output transformer, as to be negligible, which is the condition under which regeneration is critical as explained above for time $t$ during which regeneration takes place, Equation 6 reduces to $$n \doteq \alpha\left(1 - \frac{L_M V_f}{L_{Mf} V}\right) \qquad (11)$$

If both sides of Equation 11 are divided by $\alpha$, a normalized plot, as shown in Fig. 2, may be made in which the ratio $L_M/L_{Mf}$ represents the abscissa and the ratio $n/\alpha$ represents the ordinate. Regeneration can occur if the values of $L_M/L_{Mf}$ and $n/\alpha$ are such that they determine a point beneath the curve of the plot designated $$\frac{V_f}{V} = \frac{1}{2}$$

Regeneration cannot occur if the values chosen for $L_M/L_{Mf}$ and $n/\alpha$ are such that they determine a point above this curve. This curve offers the best approximation for the actual regeneration conditions for the region between the 0.25 and 0.75 abscissas. For other regions the ratio $V_f/V$ should be modified slightly, being made larger as $L_M/L_{Mf}$ increases and smaller as $L_M/L_{Mf}$ decreases. Both the curve and Equation 11 are approximations which have their highest accuracy around the region where $$\frac{L_M}{L_{Mf}} = 0.5$$

Advantageously, the secondary winding to the primary winding turns ratio of the feedback transformer is chosen as high as possible but not to exceed the large signal current gain $\alpha$ of the transistor in order to maintain a low voltage drop across the primary winding of the feedback transformer and thus permit more voltage to be developed across the output transformer primary winding. It is, of course, understood that as the number of turns on the primary winding of the feedback transformer are decreased, a certain irreducible minimum is reached, at which point insufficient voltage is produced across the primary winding to induce a voltage on the secondary winding sufficient to sustain regeneration. Another limiting factor in minimizing the size of both the feedback and output transformers is the equivalent capacitance across the primary winding. Practical experimentation for operation in the two-megacycle region has indicated that this value of capacitance for each transformer should not be more than 10 micromicrofarads. Another factor relevant to the size of the feedback transformer is the allowable leakage inductance which effectively limits the rise time of the pulse. This leakage inductance should be much less than the magnetizing inductance. Thus, the experimental results in combination with these practical limitations indicate that optimum results are obtained if the ratio of self-inductance of the output transformer to the self-inductance of the feedback transformer is in the order of 0.25 to 0.75 and may advantageously be approximately 0.5.

For practical operation in the two-megacycle region, the turns ratio of the feedback transformer should be maintained as near $\alpha$ as possible and best results are obtained if the ratio $n/\alpha$ on the normalized graph, Fig. 2, is maintained between 0.4 and 0.8. By adjusting the range of $n/\alpha$ and using this range in combination with the above-mentioned range of $L_M/L_{Mf}$, satisfactory regeneration is assured for wide variations of input pulses and applied voltages.

In one specific illustrative embodiment in accordance with this invention as depicted in Fig. 1, transistor 10 is a Western Electric type G.A. 52996 transistor having a small signal current gain $\alpha$ in the order of 2.5; output transformer 15 has a one-to-one turns ratio and an inductance $L_M$ of 0.2 microhenry; feedback transformer 18 has a secondary winding to primary winding turns ratio of 1.6:1 with five turns in the primary winding and eight turns in the secondary winding and an inductance $L_{Mf}$ of 0.4 microhenry; the resistance of the primary winding of each transformer is less than one-half an ohm; and resistors 26, 27 and 29 are 16,000, 12,000 and 3,000 ohms, respectively. Source 28 of potential delivers positive 6 volts to resistor 26 and source 25 delivers negative 8 volts to resistor 27 while source 33 of potential applies negative 8 volts to the primary of the output transformer. Source 20 applies negative 2 volts to the secondary of the feedback transformer effectively maintaining diode 21 back-biased quiescently. The emitter clock or synchronizing pulse source 30 delivers a 6 volt peak-to-peak sine wave at a frequency of the order of 2 megacycles to diode 32. Input pulses from source 22 are flat-topped pulses starting at negative 2 volts and rising to positive 2 volts and the bias applied to the emitter during the quiescent period is negative 2 volts.

Regenerators in accordance with this invention are so stable that these applied potentials as well as the input and control voltages may be varied over relatively wide ranges without destroying the sensitivity or the stability. These ranges are slightly modified at elevated temperatures of the order of 80 degrees C. due to the inability of the circuit to dissipate the heat generated by the circuit elements and the resultant change in their electrical properties. For example, with a relatively small load current of approximately 0.8 milliampere, satisfactory regeneration obtains when the potential of source 20 is reduced to 0.8 volt or the positive potential applied to resistor 26 from source 28 is varied between 1 volt and 10 volts. At this temperature it is also possible to vary the negative potential from source 33 from 5.8 to 9.5 volts or to vary the synchronizing clock voltage from 1.4 volts to 4.7 volts peak-to-peak. At temperatures in the order of 30 degrees C., the potential of source 20 may be reduced to 0.5 volt and the potential applied from source 28 may vary from 2.8 to 10 volts. Similarly, for these reduced temperatures, the negative potential of source 33 may be varied from 5.9 to 9.5 volts or the voltage applied by source 30 may vary from 1 volt to 5.5 volts peak-to-peak and still maintain satisfactory regeneration for small output currents. For large values of load current, stable regeneration is relatively easy to obtain in comparison with the situation for small values of load current. However, the margins of potentials and voltages applied to the circuit are slightly modified. For example, when the output current is of the order of 14 milliamperes, such as might be required for driving over fifteen logic circuits, and the ambient temperature is in the order of 30 degrees C., the negative potential of source 20 may be varied between 0.5 and 3 volts or the potential applied to resistor 26 from source 28 may be varied from 4 volts to 10 volts or the negative potential applied from source 33 may vary between 6.1 and 9.5 volts. Similarly, the synchronizing voltage from source 30 may be varied from 1 to 5.4 volts peak-to-peak. For large values of load current at elevated temperatures of the order of 80 degrees, the negative potential of source 20 may be varied between 1.7 and 2.7 volts or the positive potential applied to resistor 26 by source 28 may vary between 2.3 and 10 volts or the negative potential applied by source 33 may be varied between 6.4 and 8.3 volts or the synchronizing voltage applied from source 30 may vary from 1.8 to 4.7 volts peak-to-peak without substantially affecting the stability or sensitivity of the regenerator.

The power dissipated by this illustrative circuit during the quiescent period is in the order of 19 milliwatts in direct current power and 0.3 milliwatt of synchronizing pulse power. The minimum input pulse power required to initiate triggering is 1.3 milliwatts and the peak synchronizing clock power required when pulsing is 2.6 milliwatts.

It is to be understood the above-described arrangements are illustrative of the application of the principles of the invention. Numerous other arrangements may be devised by those skilled in the art without departing from the spirit and scope of the invention.

What is claimed is:

1. A pulse regenerating circuit comprising a transistor having emitter, base and collector electrodes, said base being connected to a reference potential, first means connected to said emitter for applying signals thereto, a clock pulse source, second means connected to said emitter for applying pulses from said source thereto, an output transformer, a feedback transformer having its primary winding serially connected to the primary winding of said output transformer and to the collector of said transistor, a rectifier connected between the secondary winding of said feedback transformer and said emitter poled in the forward direction of current to said emitter for applying feedback current from said feedback transformer, and means for insuring a minimum value of feedback current to said emitter when the secondary winding of said output transformer is open-circuited, said minimum value being equal to the ratio of the magnetizing current of said output transformer divided by the current gain of said transistor, said last-mentioned means comprising a turns ratio of said feedback transformer which is less than said transistor current gain.

2. A pulse regenerating circuit in accordance with claim 1 wherein the relationship of said turns ratio to the current gain of said transistor substantially conforms to the expression $$\frac{n}{\alpha}=1-\frac{V_f L_M}{V L_{Mf}}$$

where $n$ is the turns ratio of the secondary to primary windings of said feedback transformer, $\alpha$ is the current gain of said transistor, $V_f$ and V are the voltages developed across the feedback transformer primary winding and the output transformer primary winding, respectively, and $L_M$ and $L_{Mf}$ are the self-inductances of the output transformer primary winding and feedback transformer primary winding, respectively.

References Cited in the file of this patent

UNITED STATES PATENTS

| | | |
|---|---|---|
| 2,644,893 | Gehman | July 7, 1953 |
| 2,762,920 | Weil | Sept. 11, 1956 |
| 2,762,921 | Henle | Sept. 11, 1956 |
| 2,774,878 | Jensen | Dec. 18, 1956 |
| 2,802,118 | Simkins | Aug. 6, 1957 |
| 2,809,239 | Nielsen | Oct. 8, 1957 |
| 2,835,828 | Vogelsoy | May 20, 1958 |

FOREIGN PATENTS

| | | |
|---|---|---|
| 1,116,599 | France | Feb. 6, 1956 |

OTHER REFERENCES

"The Transistor" by Bell Telephone Laboratories, Western Electric Co. Inc., New York, N.Y., pages 692 and 693.